US000001291H

United States Statutory Invention Registration [19]

[11] Reg. Number: H1291

Hinton et al.

[43] Published: Feb. 1, 1994

[54] MICROPROCESSOR IN WHICH MULTIPLE INSTRUCTIONS ARE EXECUTED IN ONE CLOCK CYCLE BY PROVIDING SEPARATE MACHINE BUS ACCESS TO A REGISTER FILE FOR DIFFERENT TYPES OF INSTRUCTIONS

[76] Inventors: Glenn J. Hinton, 6130 NW. 185th Ave., Portland, Oreg. 97229; Frank S. Smith, 4525 W. Milky Way, Chandler, Ariz. 85226

[21] Appl. No.: 630,499

[22] Filed: Dec. 20, 1990

[51] Int. Cl.[5] ..... G06F 9/38

[52] U.S. Cl. ..... 395/800; 395/325; 395/375

[58] Field of Search ..... 395/800, 375

[56] References Cited

PUBLICATIONS

Andrews, "Intel RISC processors give VME boards a performance boost", Nov. 1989, Computer Design.

Wilson, "Multiple instruction dispatch drives RISC chip 66 Mips", Oct. 1989, Computer Design.

Hinton, Mar. 1989, 80960—Next Generation 80960, IEEE Compcon Spring 89.

McGeady, Mar. 1990, "The i960CA SuperScalar Implementation of 80960 Architecture", IEEE Compcon.

*Primary Examiner*—Bernarr E. Gregory

[57] ABSTRACT

A microprocessor having a memory coprocessor (10) connected to a MEM interface (16) and a register coprocessor (12) connected to a REG interface (14). The REG interface (14) and MEM interface (16) are connected to independent read and write ports of a register file (6). An Instruction Sequencer (7) also connected to an independent write port of the register file, to the REG interface and to the MEM interface. An Instruction Cache (9) supplies the instruction sequencer with at least two instruction words per clock (7). Single-cycle coprocessors (4) are connected to the REG interface (14) and a multiple-cycle coprocessors (2) are connected to the REG interface (14). An Address Generation Unit (3) is connected to the MEM interface (16) for executing load-effective-address instructions and address computations for loads and stores to thereby perform effective address calculations in parallel with instruction execution by the single-cycle coprocessor. The Instruction Sequencer (7) decodes incoming instruction words form the Cache, and issues up to three instructions on the REG interface (14), the MEM interface (16), and/or the branch logic within the Instruction Sequencer. The instruction sequencer includes means for detecting dependencies between the instructions to thereby prevent collisions between instructions. A local register cache (5) is provided connected to the MEM interface. The local register cache maintains a stack of multiple word local register sets, such that one each call the local registers are transferred from the register file (6) to the Local Register Cache (5) to thereby allocate the local registers in the register file for the called procedure and on a return the words are transferred back into the register file to the calling procedure.

10 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

| | PIPE 1 | | PIPE 2 | | PIPE 3 | |
|---|---|---|---|---|---|---|
| | P1 | P2 | P1 | P2 | P1 | P2 |
| (1) OPCODE AND OPCODE1 | XXXXXX | | | | | |
| (2) DSTABROUT | XXXXXX | | | | | |
| (3) SRC1 | | XXXXXXX | XXXXXX | | | |
| (4) SRC2 | | XXXXXXX | XXXXXX | | | |
| (5) OPCODE DECODE | | XXXXXX | | | | |
| (6) SCBOK (INPUT) | | XXXXXX | | | | |
| (7) DATA PATH CTRL | | XXXXXXX | XXXXXX | | | |
| (8) INSTR EXECUTE | | | XXXXXX | | | |
| (9) EU OUT LATCHED AND HELD | | | XXXXXXX | XXXXXX | | |
| (10) EUWRITE | | XXXXXXX | XXXXXX | | | |
| (11) DSTADRIN | | | XXXXXX | | | |
| (12) DST | | | | XXXXXX | | |
| (13) EUEVENT PROC | | | | XXXXXX | | |
| (14) SCBOK (OUTPUT) | | | | XXXXXX | | |
| (15) CCEUIDQ12 | | XXXXXX | | | | |
| (16) CCEUIDQ22 | | | | XXXXXX | | |

FIG. 5

MICROPROCESSOR IN WHICH MULTIPLE INSTRUCTIONS ARE EXECUTED IN ONE CLOCK CYCLE BY PROVIDING SEPARATE MACHINE BUS ACCESS TO A REGISTER FILE FOR DIFFERENT TYPES OF INSTRUCTIONS

CROSS REFERENCES TO RELATED APPLICATIONS

This application, which is assigned to Intel Corporation, is related to the following patents and applications, which are also assigned to Intel Corporation: U.S. Pat. No. 5,023,844, Ser. No. 07/486,408, filed on Feb. 28, 1990, granted to Arnold et al. on Jun. 11, 1991; U.S. Pat. No. 5,185,872, Ser. No. 07/486,407, filed on Feb. 28, 1990, granted to Arnold et al. on Feb. 9, 1993; U.S. Pat. No. 5,222,244, Ser. No. 07/630,497, filed on Dec. 20, 1990, granted to Carbine et al. on Jun. 22, 1993; amd copending patent applications "Data Bypass Structure in a Microprocessor Register File to Ensure Data Integrity", Ser. No. 07/488,254, filed Mar. 5, 1990; "An Instruction Decoder That Issues Multiple Instructions in Accordance with Interdependencies of the Instructions" Ser. No. 07/630,536, filed on Dec. 20, 1990; "An Instruction Pipeline Sequencer With a Branch Lookahead and Branch Prediction Capability That Minimizes Pipeline Break Losses" Ser. No. 07/630,535, filed on Dec. 20, 1990; "Instruction Fetch Unit in a Microprocessor That Executes Multiple Instructions in One Cycle and Switches Program Streams Every Cycle" Ser. No. 07/630,498, filed on Dec. 20, 1990; "A Pipeline Sequencer With Alternate IP Selection when a Branch Lookahead Preduction Fails" Ser. No. 07/686,479 filed on Apr. 17, 1991; and, "A High Bandwidth Output Hierarchical Memory Store Including a Cache, Fethc Buffer and ROM" Ser. No. 07/630,534, filed on Dec. 20, 1990.

BACKGROUND OF THE INVENTION

1. Field of the Invention

The invention relates to data processing systems and more particularly to a superscaler pipelined microprocessor and a method and apparatus therein for causing multiple functions to be performed during each pipeline stage.

2. Description of the Related Art

Users of modern computers are demanding greater speed in the form of increased throughput (number of completed tasks per unit of time) and increased speed (reduced time it takes to complete a task). The Reduced Instruction Set Computer (RISC) architecture is one approach system designers have taken to achieve this. While there is no standard definition for the term Reduced Instruction Set Computer (RISC), there are some generally accepted characteristics of a RISC machine. Generally a RISC machine can issue and execute an instruction per clock cycle. In a RISC machine only a very few instructions can access memory, so most instructions use on-chip registers. So, a further RISC characteristic is the provision of a large number of registers on chip. In a RISC machine the user can specify in a single instruction two sources and a destination.

In U.S. Pat. No. 4,891,743 "Register Scorboarding on a Microprocessor chip" by David Budde, et al., granted on Jan. 2, 1990 and assigned to Intel Corporation, there is described apparatus for minimizing idle time when executing an instruction stream in a pipelined microprocessor by using a scoreboarding technique. A microinstruction is placed on a microinstruction bus and a microinstruction valid line is asserted. When a load microinstruction is decoded, a read operation is sent to a bus control logic, the destination register is marked as busy, and execution proceeds to the next current microinstruction. The marking provides an indication as to whether a current instruction can be executed without interfering with the completion of a previous instruction. The marking of registers gives rise to the term "scoreboarding". Execution of the current microinstruction proceeds provided that its source and destination registers are not marked "busy"; otherwise the microinstruction valid line is unasserted immediately after the current microinstruction appears on the microinstruction bus. The current microinstruction is thereby canceled and must be reissued. When data is returned as the result of a read operation, the destination registers are marked as "not busy".

The above-referred copending patent application Ser. No. 07/486,407 extends this prior scoreboarding technique to encompass all multiple cycle operations in addition to the load instruction. This is accomplished by providing means for driving a Scbok line to signal that a current microinstruction on a microinstruction bus is valid. Information is then driven on the machine bus during the first phase of a clock cycle. The source operands needed by the instruction are read during the second phase of the clock cycle. The resources needed by operands to execute the instruction are checked to see if they are not busy. The Scbok signal is asserted upon the condition that any one resource needed by the instruction is busy. Means are provided to cause all resources to cancel any work done with respect to executing the instruction to thereby make it appear to the rest of the system that the instruction never was issued. The instruction is then reissued during the next clock cycle.

The above-referenced copending patent applications Ser. No. 07/486,408 and Ser. No. 07/488,254 describe a random access (RAM) register file having multiple independent read ports and multiple independent write ports that provide the on-chip registers to support multiple parallel instruction execution. It also checks and maintains the registers scoreboarding logic as described in Ser. No. 07/486,407. The register file contains the macrocode and microcode visible RAM registers. The register file provides a high performance interface to these registers through a multi-ported access structure, allowing four reads and two writes on different registers to occur during the same machine cycle. This register file provides a structure allows multiple parallel accesses to operands which allows several operations to proceed in parallel.

To take full advantage, a processor should be organized so that it can execute code from an internal instruction cache while having the ability to add application specific modules to meet different user applications. It should be able to execute multiple instructions in one clock cycle even when doing loads and branchesd.

It is therefore an object of the invention to provide a microprocessor in which multiple instructions are executed in one clock cycle.

SUMMARY OF THE INVENTION

Briefly, the above object is accomplished in accordance with the invention by providing a microprocessor having a memory coprocessor (10) connected to a MEM interface (16) and a register coprocessor (12)

connected to a REG interface (14). A register file (6) is provided having a first independent read port, a second independent read port, a third independent read port, a fourth independent read port, a first independent write port and a second independent write port. The REG interface (14) is connected to the first and second independent read port and the first independent write port. The MEM interface (16) is connected to the third and fourth independent read ports and the second independent write port. An Instruction Sequencer (7) is connected to the REG interface and to the MEM interface.

An Instruction Cache (9) supplies the instruction sequencer with at least three instruction words per clock (7). Single-cycle coprocessors (4) are connected to the REG interface (14) and a multiple-cycle coprocessors (2) are connected to the REG interface (14). An Address Generation Unit (3) is connected to the MEM interface (16) for executing load-effective-address instructions and address computations for loads and stores to thereby perform effective address calculations in parallel with instruction execution by the single-cycle coprocessor.

The Instruction Sequencer (7) decodes incoming instruction words form the Cache, and issues up to three instructions on the REG interface (14), the MEM interface (16), and/or the branch logic within the Instruction Sequencer. The instruction sequencer includes means for detecting dependencies between the instructions being issued to thereby prevent collisions between instructions.

In accordance with an aspect of the invention, a local register cache (5) is provided connected to the MEM interface. The local register cache maintains a stack of multiple-word local register sets, such that on each call the local registers are transferred from the register file (6) to the Local Register Cache (5) to thereby allocate the local registers in the register file for the called procedure and on a return the words are transferred back into the register file to the calling procedure.

A method of operation of a five pipe-stage pipelined microprocessor is taught. During the first pipe stage the Instruction Sequencer accesses said instruction cache and transfer from said I-Cache to said Instruction Sequencer three or four instruction words depending on whether the instruction pointer (IP) points to an even or odd word address.

During a second pipe stage, the Instruction Sequencer decodes instructions and checks, for dependencies between the issuing instructions. It then issues up to three instructions on the three execution portions of the machine, the REG interface, the MEM interface, and the branch logic within the Instruction Sequencer, only the instructions that can be executed. The sources for all the issued operations are read from the register file during the second pipe stage and, the sources for all the issued operations are sent out to the respective units to use.

During a third pipe stage, the results of doing the EU (4) and/or the AGU (3) ALU/LDA operations are returned to the register file which writes the results into the destination registers of the register file.

In accordance with an aspect of the invention, during the third pipe stage, the address is issued on the external address bus for loads and stores that go off-chip.

During a fourth pipe stage data is placed on the external data bus.

During a 5th pipe stage the bus controller returns the data to the register file.

BRIEF DESCRIPTION OF THE DRAWINGS

The foregoing and other objects, features, and advantages of the invention will be apparent from the following more particular description of a preferred embodiment of the invention as illustrated in the accompanying drawings.

FIG. 5 is a timing diagram of the operation of the execution unit; and,

DESCRIPTION OF THE PREFERRED EMBODIMENT

U.S. Pat. No. 4,891,753 "Register Scoreboarding on a Microprocessor Chip" granted on Jan. 2, 1990 and assigned to Intel Corporation describes a microprocessor which has four basic instruction formats that must be word aligned and are 32-bits in length. The REG format instructions are the register-to-register integer or ordinal (unsigned) instructions. The MEM format instructions are the loads, stores, or address computation (LDA) instructions. The MEM format allows an optional 32-bit displacement. The CTRL format instructions are the branch instructions. The COBR format is an optimization that combines a compare and a branching one instruction. The microprocessor in which the present invention is embodied has a 32-bit linear address space and has 32 general purpose registers. Sixteen of these registers are global and 16 are local. These 16 local registers are saved automatically on a call and restored on each return. The global registers, like the registers in more conventional microprocessors, retain their values across procedure boundaries.

Figure 1:
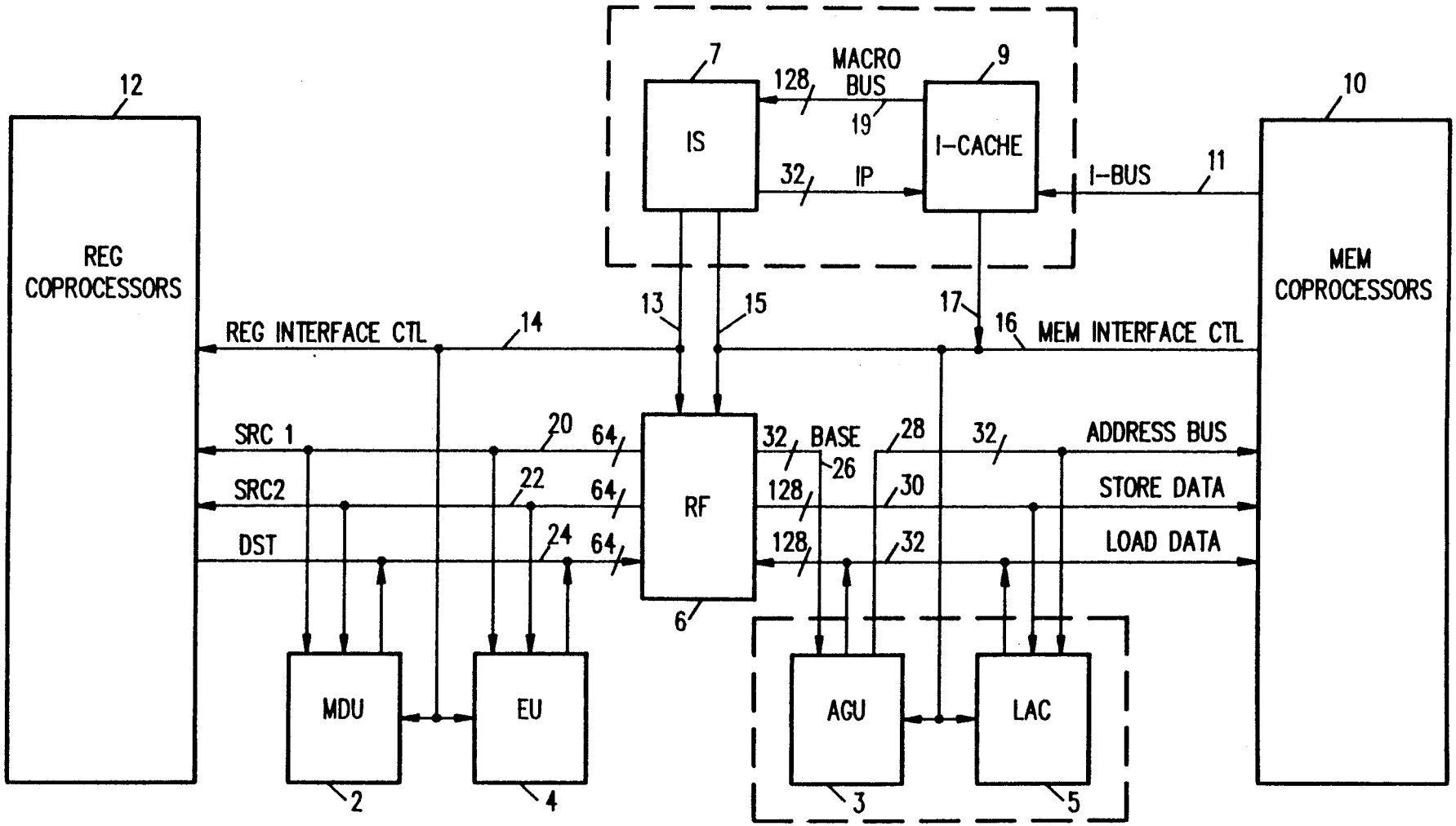
FIG. 1 is a functional block diagram of each of the major components of the microprocessor in which the invention is embodied.

As shown in FIG. 1 the microprocessor in which the present invention is embodied has seven basic units. They are:

The on-chip RAM/Stack Frame Cache (I-cache 9)
The Instruction Sequencer (IS-7)
The Register File (RF-6)
The Execution Unit (EU-4)
The Multiply/Divide Unit (MDU-2)
The Address Generation Unit (3,5)

These units are briefly described below. For more detailed information about each of these units refer to the above-identified copending applications.

Instruction Cache and ROM (I-Cache)

This unit (9) is described more fully in copending applications "An Instruction Decoder That Issues Multiple Instructions in Accordance with Interdependencies of the Instructions" Ser. No. 07/630,536 and "A High Bandwidth Output Hierarchical Memory Store Including a Cache, Fetch Buffer and ROM" Ser. No. 07/630,934. The instruction cache and ROM (9) provides the Instruction Sequencer (7) with instructions every cycle. It contains a 2-way set-associative instruction cache and a microcode ROM. The I-Cache and ROM are essentially one structure. The ROM is an always-hit portion of the cache. This allows it to share the same logic as the instruction cache, even the column lines in the array. The I-Cache is four words wide and is capable of supplying four words per clock to the Instruction Sequencer (IS-7). It consistently supplies three or four words per clock regardless of the alignment of the instruction address. The I-Cache also contains the external fetch handling logic that is used when an instruction fetch misses the I-Cache.

Instruction Sequencer (IS)

This unit (7 is described more fully in copending applications "An Instruction Decoder That Issues Multiple Instructions in Accordance with Interdependencies of the Instructions" Ser. No. 07/630,536, "An Instruction Pipeline Sequencer With a Branch Lookahead and Branch Prediction Capability That Minimizes Pipeline Break Losses" Ser. No. 07/630,535, "Instruction Fetch Unit in a Microprocessor That Executes Multiple Instructions in One Cycle and Switches Program Streams Every Cycle" Ser. No. 07/630,498, "A Pipeline Sequencer With Alternate IP Selection when a Branch Lookahead Prediction Fails" Ser. No. 07/686,479 and "An Instruction Decoder Having Multiple Alias Registers Which Provide Indirect Access in Microcode to User Operands" U.S. Pat. No. 5,222,244.

The instruction sequencer (7) decodes the incoming four instruction words from the I-Cache. It can decode and issue up to three instructions per clock but it can never issue more than four instruction in tow clocks. This unit detects dependencies between the instructions and issues as many instructions as it can per clock. The IS directly executes branches. It also vectors into microcode for the few instructions that need microcode and also to handle interrupts and faults. The instruction decoder (ID) and the pipeline sequencer (PS) are parts of the Instruction Sequencer (7). The IS decodes the instruction stream and drives the decoded instructions onto the machine bus.

Register File (RF)

This unit (6) is described more fully in copending applications "Register Scoreboarding Extended to all Multiple-cycle operations in a Pipelined Microprocessor", Ser. No. 07/486,407, "Six-way Access Ported RAM Array Cell", Ser. No. 07/486,408, and "Data Bypass Structure in a Microprocessor Register File to Ensure Data Integrity", Ser. No. 07/488,254.

The RF (6) has 16 local and 16 global registers. It has small number of scratch registers used only by microcode. It also creates the 32 literals (0–31 constants) specified by the architecture. The RF has 4 independent read ports and 2 independent write ports to support the machine parallelism. It also checks and maintains the register scoreboarding logic which is described more fully in copending application Ser. No. 07/486,407.

Execution Unit (EU)

The EU (4) performs all the simple integer and ordinal (unsigned) operations of the microprocessor in which the present invention is embodied. All operations take a single cycle. It has a 32-bit carry-look-ahead adder, a boolean logic unit, a 32-bit barrel shifter, a comparator, and condition code logic.

Multiply-Divide Unit (MDU)

The MDU (2) performs the integer/ordinal multiply, divide, remainder, and modular operations. It performs an 8-bit clock multiple and a 1 bit-per-clock divide. A multiply has 4 clock throughput and 5 clock latency and a divide has 37 clock throughput and 38 clock latency.

Address Generation Unit (AGU)

The AGU (3) is used to do the effective address calculations in parallel with the integer execution unit. It performs the load-effective-address instructions (LDA) and also does the address computations for loads and stores. It has a 32-bit carry-look-ahead adder and a shifter in front of the adder to do the prescaling for the scaled index addressing modes.

Local Register Cache (LRC)

The LRC (5) maintains a stack of multiple 16-word local register sets. On each call the 16 local registers are transferred from the RF to the LRC. This allocates the 16 local registers in the RF for the called procedure. On a return the 16 words are transferred back into the RF to the calling procedure. The LRC uses a single ported RAM cell that is much smaller than the 6-ported RF cell. This keeps the RF small and fast so it can operate at a high frequency while allowing 8+ sets of local registers to be cached on-chip. With this LRC the call and return instructions take 4 clocks.

On-Chip Coprocessors

The microprocessor in which the present invention is embodied has two very high performance interfaces—the REG interface (14) and MEM interface (16). These interfaces allow application-optimized modules to be added to tailor the system to a particular application area. The REG interface is where all the REG format instructions are executed. The EU (4) and MDU (2) described above are coprocessors (on-chip functional units) sitting on the REG interface. Other units can be added, such as a Floating Point Adder and a Floating Point Multiplier. The REG interface has two 64-bit source buses, src 1 (20) and src 2 (22) and a 64-bit destination bus (24). These buses provide a bandwidth of 528 MB/sec for source data and 264 MB/sec for result data to and from this REG interface.

One instruction per clock can be issued on this REG part of the machine. The operations can be single or multi-cycle as long as they are independently sequenced by the respective REG coprocessor (12). The coprocessors on the REG interface arbitrate among themselves if necessary to return their results. There can be multiple outstanding multi-cycle operations such as integer or floating point multiply and divide. The number outstanding is limited only by the number and nature (whether pipelined or not) of the REG coprocessors.

The MEM interface (160 is where all MEM format instructions are executed. It also connects the system to the memory subsystem. The on-chip memory subsystem can be a bus controller that connects to off-chip members. The AGU (3) and LRC (5) mentioned above are coprocessors on the MEM interface. Other units can be added to this interface such as TLB, a data cache, an on-chip RAM array, etc. This interface has a 32 bit address port, a 128-bit store bus, and a 128-bit load bus. This allows 528 MB/sec to be transferred each way between the core processor and the memory subsystem. One instruction per clock can be issued on this interface.

The operations can be single or multi-cycle just as described above for the REG coprocessors. The coprocessors on this interface arbitrate among themselves if needed to return their results. There can also be multiple outstanding operations on this part of the machine such as multiple outstanding loads. The number of outstanding operations is constrained only by the nature of the bus controller or other on-chip coprocessors.

The majority of all instructions executed use no microcode; they are directly issued like any other RISC machine. Microcode is used for a few instructions but mainly for fault, interrupt handling, and debug (trace) handling support. There are a few extra microinstructions that help speed up critical operations such as call and return and that access internal control registers, etc.

Key Microcoded Instructions

| | |
|---|---|
| Call/Return | (4 clocks) |
| Cmp_and_Branch | (1 clock) |
| Branch_and_Link | (1 clock) |
| Some Effective Address Computations | |
| Atomic operations (for semaphores, etc) | |

Microcoded instructions generally have no start-up overhead associated with them. They are seen in a lookahead manner by the Instruction Sequencer (7) so it can get ready for them while the current instructions are issued. Because of this, the microinstructions of a microcoded sequence show up seamlessly between the previous and subsequent non-microcoded macro instructions.

The Basic Pipeline

Figure 3:
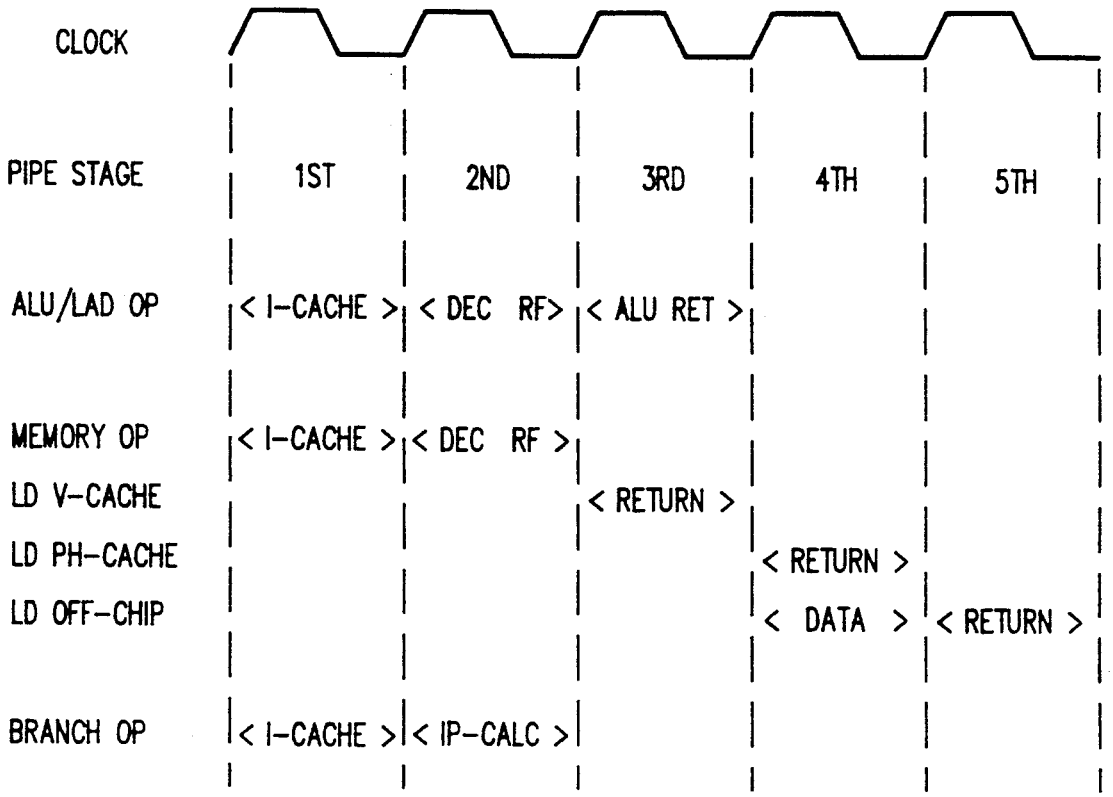
FIG. 3 is a timing diagram of a three stage pipeline for the basic ALU/LDA-type operations, a three, four, or five stage pipeline for loads, and a two stage pipeline for branches.
Figure 4:
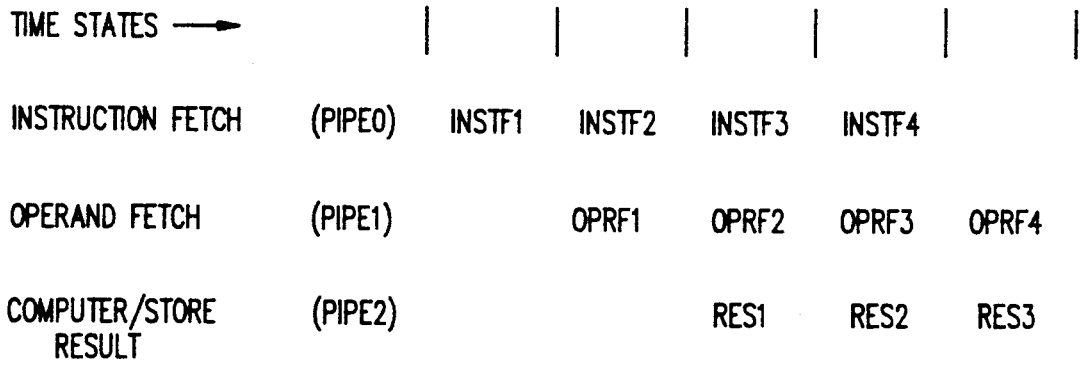
FIG. 4 is a timing diagram of the basic three-stage pipeline through which most instructions flow.

As FIG. 3 shows, the microprocessor in which the present invention is embodied has a three stage pipeline for the basic ALU/LDA-type operations, a three, four, or five stage pipeline for loads, and a two stage pipeline for branches.

Briefly, the pipeline operates as follows. During the first ppe stage, pipe 0, the Instruction Sequencer (7) accesses the instruction cache (9). The I-Cache returns three or four instruction words depending on whether the UP points to an even or odd word address.

During the second pipe stage, pipe 1, the Instruction Sequencer (7) decodes and issues up to three instructions on the three execution portions of the machine—the REG interface (14), the MEM interface (16), and the branch logic within the IS (7). Hardware checks for dependencies and only issues the instructions that can be executed. During this second pipe stage the RF (6) reads the sources for all the issued operations and sends them to the respective units to use. The IS also calculates the new UP now for branch operations.

During the third pipe stage, pipe 2, the EU (4) and/or the AGU (3) do the ALU/LDA operations and return the results to the RF. The RF then writes the results into the destination registers.

If the operation will take more than one cycle, the scoreboard bits are set (126) and the bus controller (10) issues the address on the external address bus for loads and stores that go off-chip (118).

During the fourth pipe stage, pipe 3, assuming zero wait states, the data return on the external data bus to the bus controller (120).

During the fifth pipe stage, pipe 4, the bus controller (10) returns this data to the RF (122).

Wide and Concurrent Buses

Wide and concurrent buses are provided to feed the respective units without bottlenecks. The microprocessor in which the present invention is embodied can take much more advantage of wide buses than most other RISC-type machines. It has instructions to move, load, or store 64, 96, or 128-bit operands. The floating point part of the instructions has 64 and 80-bit operands. Wider buses make these operations faster and also easier to implement. The on-chip buses that are wider than 32 bits are the 128-bit wide instruction cache bus, the load, bus, the store bus, and the 64-bit source 1, source 2, and result buses.

Parallel Decode and Issue

The parallel decode and issue starts with the 4 words/clock bandwidth from the I-Cache (9). A parallel decoder in the Instruction Sequencer (7) looks at this window of 3 or 4 instructions and operates on them. The IS issues the instruction in the first word. It looks ahead past the first instruction to see if the second word is a memory operation. If so that IS issues it also. The IS looks ahead at the second through fourth words to see if any one is a branch. If so it issues the first branch it sees. The multi-ported register file allows all these operations to concurrently access the data they need.

Multiple Independent Functional Units

The three concurrent interfaces described above connect to multiple independent functional units or on-chip coprocessors. The standard functional units to perform the basic instruction set are the Execution Unit (4), the Multiply/Divide Unit (2), the Address Generation Unit (3), the Local Register Cache (5), and a bus controller (10). Others can be added to provide high performance floating point, provide more performance through caching, or to do a peripheral function.

The microprocessor in which the present invention is embodied requires all instructions to be executed in the same manner as they would if they were being executed sequentially. The system does not know how long the coprocessors connected to it will take to complete the operations they have been given to perform. For example, a load on the external bus with its asynchronous wait states.

Parallelism is managed by using resource scoreboarding, as described in the above-identified copending application Ser. No. 07/486,407. Each instruction needs to use certain resources to execute. A resource might be a register, a particular functional unit, or even a bus. It any instruction being issued is lacking any needed resource then it must be stopped.

During the second pipe stage shown in FIG. 3, the resources are checked concurrently with the issuing and beginning of the instructions so this does not slow down the operating frequency. Each instruction is conditionally canceled and ressued depending on the resource check for that instruction. Register Scoreboarding sets the destination register or registers busy once it passes the resource check. When the result returns—whether 1 or many cycles later—the resultant register gets marked as not busy and free to use. Each multicycle functional unit maintains a busy signal that is used to delay a new instruction that needs to use this busy unit.

Branch Prediction and Condition-Code Scorboarding

Most instructions do not set the condition codes. In general, the compare instructions are the only operations that set them. This arrangement allows unrelated operations to be placed between compares and branches so the condition codes are guaranteed to be settled before a conditional branch needs to use them.

If this system did a compare and a branch one instruction at a time then the condition codes would always be settled. However, the IS does branch lookahead. This lookahead effectively causes one or two delay slots between a compare and a branch since the IS sees the branch one or two clocks earlier that if it did just one operation per clock. Sometimes there are no unrelated operations that can be placed in the delay slot between a compare and when a conditional branch is executed. The IS uses branch prediction to help hide these 1 or 2 delay slots between the compare and the branch. Rather than hang and wait for the condition codes to become valid a guess is made as to which way to branch. The microprocessor in which the present invention is embodied has a static branch prediction bit used to determine the branch guess direction. The compiler or assembler sets the bit based on the most likely branch direction. This gives the most flexibility in chosing the branch guess alogrith—including profiling the application and setting the bits based on the profile.

Once the guess is made, the system begins actual execution at the assumed target. As long as the guess is correct, the prediction hides completely the condition code delay slots. The IS keeps track of condition code altering instructions to scoreboard the condition codes. When the condition codes have settled, the IS checks to see if the guess was correct. If the guess is wrong it will cause a one or two clock delay versus if it guessed correct. This is a win or tie mechanism. The guess case is never worse than it no guess were made as long as the code is in the I-Cache. The incorrect instructions are canceled using the same mechanism used to handle the register and unit scoreboarding mentioned above.

The performance of the microprocessor in which the present invention is embodied depends on several factors: the on-chip I-cache size, whether or not there is an on-chip D-cache, the external bus bandwidth and latency (wait states).

The term "coprocessor" is used herein to designate hardware that is used to perform transformations on data that is sourced/returned to the register file. A floating point unit, a DMA unit, or a DSP module are all examples of coprocessors.

The system has a 32-bit bit linear address space and 32 general purpose registers. 16 of these registers are global and 16 are local registers. The local registers are pushed onto an on-chip stack-frame cache on each call and popped back off on each return. This greatly reduces off-chip register saving and restoring when doing calls and returns. The global registers are like conventional registers which retain the same values across subroutine boundaries.

The instructions include integer/ordinal arithmetic operations (including multiply, divide, remainder), logical and bit manipulation operators, a rich set of conditional branch and comparison instructions, and load, store, and load-effective-address instructions. The system has a full complement of addressing modes for efficient memory addressing. All arithmetic/logical/bit operations have up to 3 register specifiers-two for sources and one for the destination. the destination.

There are seven main interfaces to the rest of the chip. They are:

MEM coprocessor interface
Execution or REG coprocessor interface
Event interface
Microcode Flag interface
Special Function Register interface
ICE Interface
Clock interface.

The Memory Coprocessor Interface

The MEM format instructions (load, store, lda, instruction fetch, etc) are executed. This interface is used to allow the system to talk to the memory subsystem. The Address Generation unit (AGU) and the Instruction Sequencer (IS) fetch logic are connected to this interface as MEM coprocessors. This interface is connected to the BCL and the on-chip RAM/stack frame cache unit. The MEM coprocessor interface could also connect to other on-chip MEN coprocessors such as a DMA, a TLB, or general data cache. It has a 32-bit memory address bus, a 128-bit store bus, and a 128-bit load bus along with the MEM part of the machine) bus to control it. It can have an arbitrary number of MEM coprocessors connected to it.

The Execution or REG Coprocessor Interface

The REG format instructions are executed on this interface. The Execution Unit (EU) is connected to this interface as a REG coprocessor. This interface is used to allow the addition of other on-chip execution coprecessors such as an FPU, DSP unit, etc. The REG coprocessor interface has two 32/64-bit sources, one 32/64-bit result or destination bus, along with the REG portion of the machine) bus to control it. It is very flexible and simple yet allows very high performance coprecessors to connect to it. It can have an arbitrary number of REG coprocessors connected to it.

The Clock Interface

This interface is the chip clock phases for a clock as described in Imel U.S. Pat. No. 4,816,700. The system uses the overlapped clock phases to help achieve the performance requirements but will also work with the traditional in-overlapped clock designs at a reduced operating frequency.

Instruction Flow

Most instructions flow through a simple there stage pipeline shown in FIG 3. During the first stage of the pipeline, pipe 0, the next instruction address is calculated and used to fetch the next instruction (INSTf1) from the instruction cache to execute. In pipe 1 the instruction is decoded and issued to the execution unit and then the source operands (OPRf1) are read and sent to the execution unit. In pipe 2 the operation is performed and the result (RES1) is returned to the register file. The hardware is segmented into three separate pieces, each roughly associated with a stage in the pipeline. Pipe 0 hardware roughly corresponds to the Instruction Sequencer (IS). Pipe 1 hardware roughly corresponds to the Register File (RF) and Pipe 2 hardware is mostly contained within the Execution Unit (EU).

In this specification, signals follow a naming convention to help clarify the description of the pipeline. It is based on the pipeline stage and the clock phase. A control signal latched in the clock phase 2 (Ph2) portion of pipeline stage 1 has a suffix onf q12, e.g. LdRegq12. The "q" is a delimiter indicating that the signal is latched to trapped and so will be constant for the phase indicated and also the following phase. The "12" indicates pipe 1 ph2. Other examples are S1Adrq11, BclGntq41, etc. If a signal is only valid during one phase (for example a precharge/discharge signal) it is suffixed with "u21", e.g. LdRamul12. The "u" delimiter indicates that this signal is only valid for one phase.

Pipeline Operation

Figure 6A:
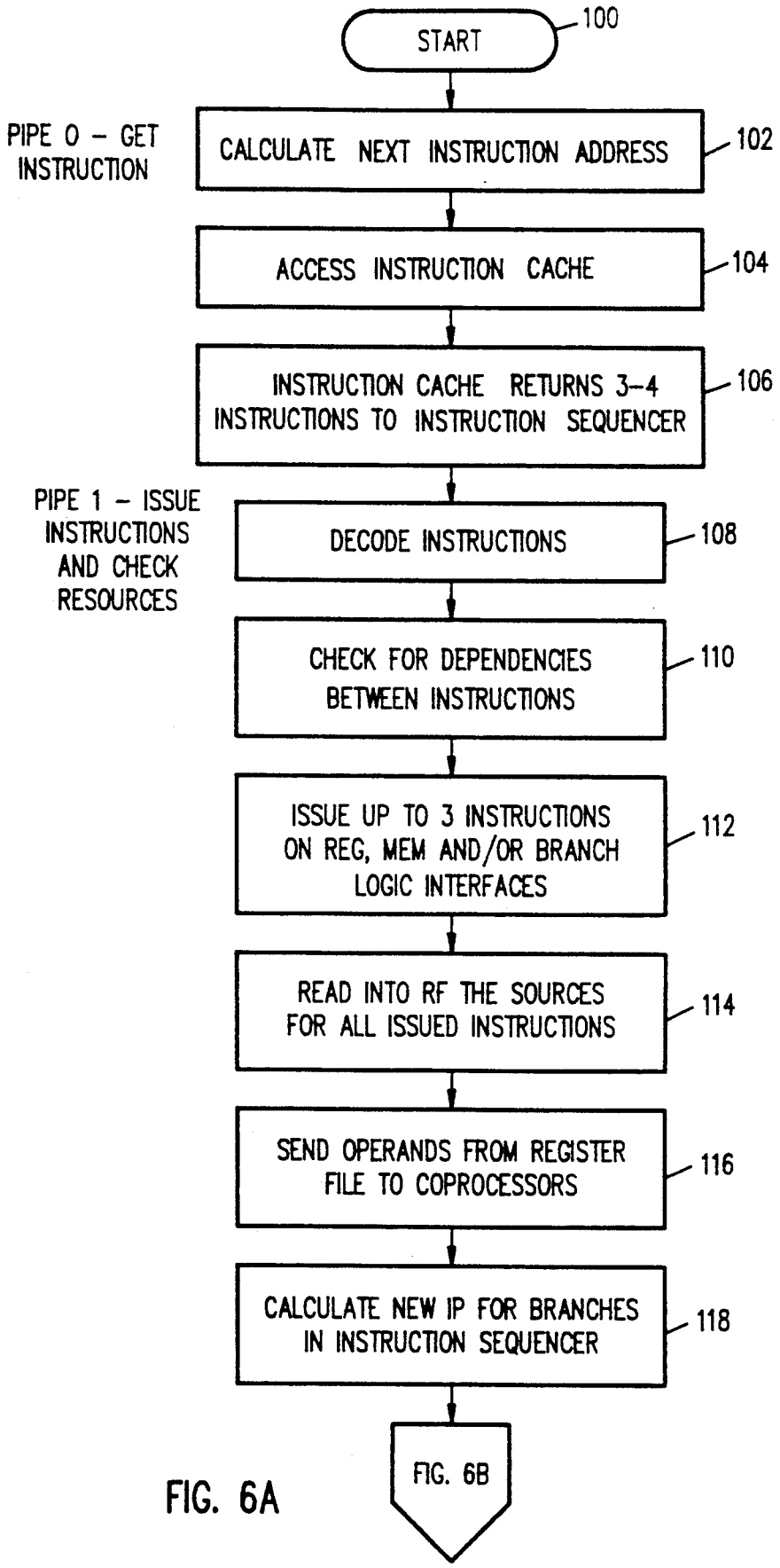
FIGS. 6A and 6B comprises a flow chart of the method of operation of the microprocessor.
Figure 6B:
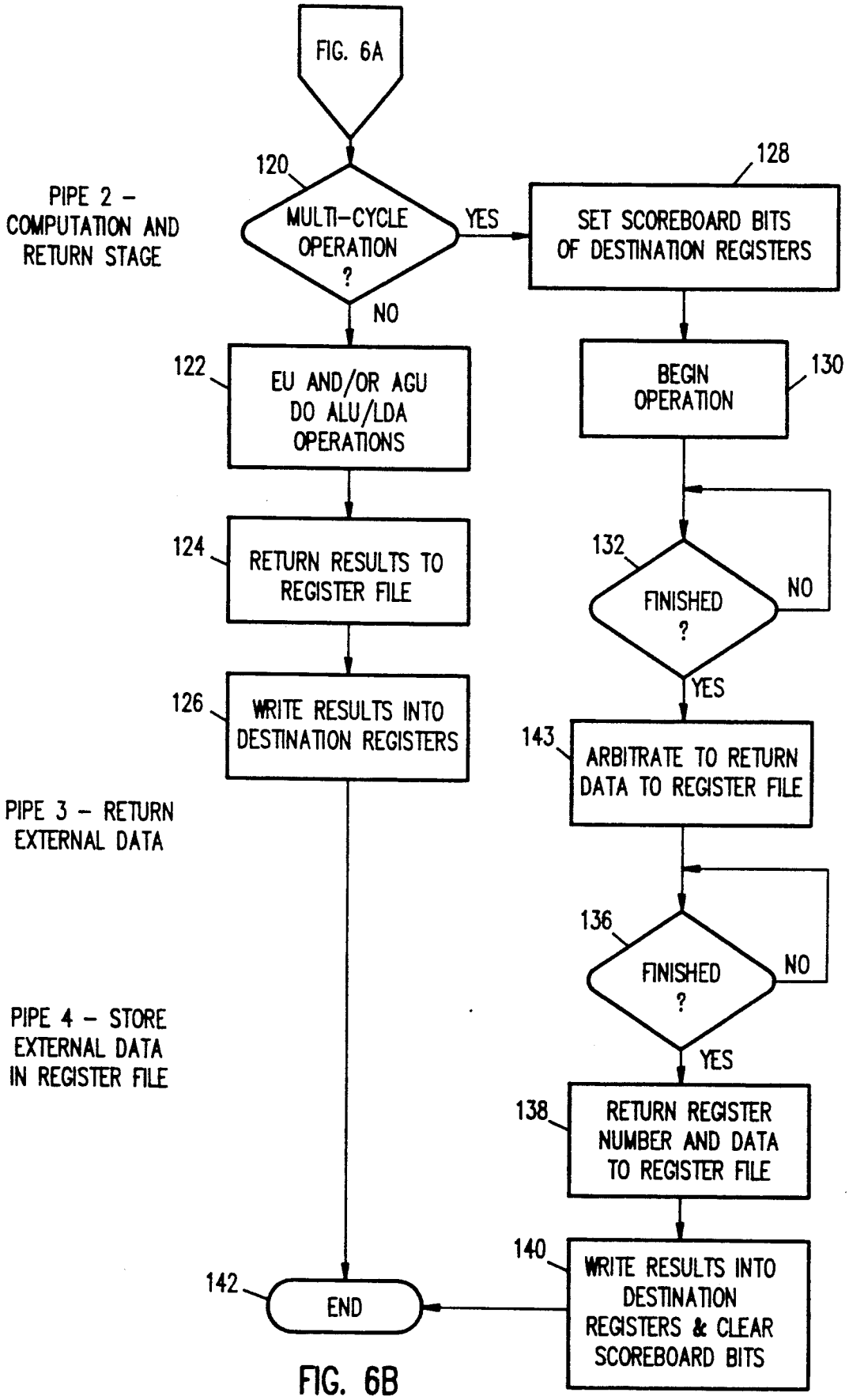

Refer to the flow diagram of FIGS. 6A and B for a flow of operations as an instruction passes through each stage of the pipeline.

Pipe 0-Get the Instruction

Pipeline stage 0 is when the Instruction Sequencer (7) calculates the next instruction address (102). This could be a macro-instruction or micro-instruction address. It is either the next sequential address or the targer of a branch. The IS uses the condition codes or the microarchitecture flags signals to tell which way to branch. If they are not valid yet when the IS sees a branch it guesses whether to take or not take the branch based on the take branch bit in the branch instruction. Execution is begun on the path based on that guess. If the guess was wrong the IS cancels the instructions begun on the wrong path and begins instruction fetching along the correct path.

The Instruction Sequencer (7) accesses (104) the instruction cache (9). The I-Cache returns (106) three or four instruction words depending on whether the IP points to an even or odd word address.

Pipe 1—Emit stage— Issue and check all resources

During the second pipe stage, pipe 1, the Instruction Sequencer (7) decodes (108) and issues up to there instructions of the there execution portions of the machine, the REG interface (14), the MEM interface (16), and the branch logic within the IS (7). Hardware checks for dependencies (110) and only issues (112) the instructions that can be executed. During this second pipe stage the RF (6) reads (114) the sources for all the issued operations and sends them to the respective units to use The IS also calculates the new IP now for branch operations.

The instructions get sent (116) to the other units by being driven on the machine bus which consists of three parts:

1. The REG format instruction portion (add, mult, shl, etc).
2. The MEM format instruction portion (ld, st, lda, instruction fetch, etc).
3. The CTRL format portion (branches).

Each part of the machine bus goes to the units that help execute that type of instruction. For example the Register file supplies the sources for both a store and an XOR operation so it looks at both the REG and MEM portion of the machine bus. The CTRL portion stays within the Instruction Sequencer since it directly executes the branch operations.

When an instruction is used several things happen. First, the information is driven on the machine bus during q11. Then during q12 the source operands are read and the resources needed to execute the instruction are checked to see if they are all available. If they are available then the scoreboard ScbOK signal is left asserted and the instruction is officially issued. If any resource needed by the instruction is busy (reserved by a previous incomplete instruction or full because already working n as much as it can handle) then the ScbOK signal is deasserted by pulling it low. This tells any unit looking at that instruction to cancel any work done; thus making it appear as if it never happened. The IS will then attempt to reissue the instruction on the next clock so the same sequence of operations will repeat.

If the instruction address is not in the instruction cache when it is checked during q02— if there is a cache miss— then the fetch logic issues a fetch on MEM side of machine durig q11. This fetch looks just like a normal quad word load except the destination of the fetch is the Instruction Sequencer rather than the Register File.

Pipe 2— Computation stage and return stage.

During this stage the EU (4) and/or the AGU (3) do the ALU/LDA operations (122) and return (123) the results to the RF. The RF then writes (124) the results into the destination registers. The computation is begun and completed in one phase if it is a simple single-cycle ALU operation, the "no" path out of decision block (120). If the operation is a long one, the "yes" path out of decision block (120), it takes more than 1 clock and the result or destination registers are marked as busy by setting the scoreboard bits (126). A subsequent operation needing that specific register resource will be delayed until this long operation is completed. This is called scoreboarding the register. There is one bit per 32-bit register called the scoreboard bit that is used to mark it busy if a long instruction. This scoreboard bit is checked during q12.

If the operation is a simple ALU type operation then the result is computed during q21 (block 122) and returned to the register file during q22 (block 123). As the data is written to the destination register the scoreboard bit is cleared marking the register available for use by another instruction.

During the third pipe stage, the address is issued (128) on the external address but for loads and stores that go off-chip.

Pipe 3

During the fourth pipe stage, pipe 3, assuming zero wait states, the data returns (130) on the external data bus to the bus controller.

Pipe 4

During the fifth pipe stage, pipe 4, the bus controller (10) sends this data to the RF (12) and the register file writes the results into the destination registers and clears the scoreboard bits (134).

Register file parallelism

The register file (6) is a 36 entry by 32-bit register file that is accessible from six ports and is organized as nine rows of four words each. It contains 16 global registers 16 local registers and 4 scratch registers. Two register file ports (128bits wide) interface to the memory interface through two separate 128 -bit busses that are operated at 32 Mhz (512MByte bandwidth each). These two ports allow LOAD data from a previous read operation and STORE data from a current write access to be processed in the register simultaneously. Another 32-bit port allows an address or address reduction operand to be simultaneously fetched. Two more 64-bit ports allow simultaneously two source operands to be fetched and operated on by either the execution hardware or by an application-chip's REG coprocessor hardware. The final 64-bit port allows the result from the previous operation (pipelined execution) to be stored simultaneously with the current operation's source operand reads. Thus, the multi-ported register file allows one simple logic/arithmetic operation to be performed every cycle and, at the same time, it allows one memory operation (LOAD/STORE) to be performed every clock cycle. The register file is also designed to allow multiple operations to be in progress. This is a useful feature that improves performance where a result from a previously started operation is not yet available, but other unrelated operations can be executed in parallel. This is sometimes called overlapped execution and has usually only been applied to LOAD operations. In the current system, overlapped execution is applicable to all multiple-cycle operations such as multiply, divide, load, etc.

Instruction Sequencer parallelism

The instruction sequencer is designed to take advantage of the register file's parallelism. It looks at up to four instructions in every cycle and issues up to 3 instructions at a time. It tries to issue a simple REG format instruction (ALU operation for example), a MEM format instruction (ld, st, lda), and a CTRL (branch) operation to the differnt coprocessors every cycle if it can. The system can sustain issuing and executing two instructions per clock; thus it can sustain executing at a peak rate of 64 MIPS when operated at an internal clock rate of 32 Mhz.

Simple branches and loads can be executed completely in parallel with simple REG format operations to achieve the maximum execution rate. A simple four-instruction sequence is shown in below that achieves 64 MIPS provided the LOAD instruction gets data from a 2-state on-chip RAM and the branch taken guess ahead) opcode bit is set.

| | | |
|---|---|---|
| seq: | add g4,g5,g5 | \|g5 = g4 + g5; |
| | ld (mem), g4 | \|load g4 with data from RAM |
| | cmpdec; | \|compare and decrement loop counter |
| | be seq; | \|branch if equal to seq: |

This sequence is shown below from a pipe 0 perspective. It would execute in a tight two cycle loop.

| | | |
|---|---|---|
| state 1 | add ld | |
| state 2 | cmpdec | branch |
| state 3 | add ld | |
| state 4 | cmpdec | branch |
| state 5 | add ld | |
| state 6 | cmpdec | branch |

This sequence of instructions takes advantages of several performance optimization features: register scoreboarding on the LOAD, instruction look ahead and parallel instruction execution, and finally branch prediction. In the case of an incorrect branch prediction, 1 to 2 instructions are cancelled and the correct sequence is started.

The instruction sequencer can do this looking ahead whenever the first instruction it fetches is a simple REG format RISC operation (e.g. add, xor, multiply). When instruction lookahead is enabled, it also allows microcoded instructions to get a one cycle head-start in going through the internal pipeline as the current instruction is being issued. This improves the execution time of these micro coded instructions by one clock compared to execution with look ahead disabled. If the current instruction requires microcode interpretation or is a branch then instruction look ahead is disabled.

Instruction Cache

Since the instruction sequencer has a very big appetite for instructions, the system incorporates an instruction cache that can deliver up to four instructions per clock cycle to the instruction sequencer. This cache allows inner loops of execution to occur without requiring external instruction fetches that could collide with data fetches and decrease performance. This cache also allows us to keep the pipeline depth low without impacting frequency in the following manner. As instructions get updated into the instruction cache (e.g. during the first pass through a loop) some precoding of the instructions occurs. This predecoding expands the instruction width from 32 bits to 35 bits when stored in the instruction cache. When read out of the cache, these extra bits allow several instruction look ahead decisions to be made without associated decoding delays. The integrated cache is consolidated with the microcode ROM since partially decoded macrocode is identical in format to internal microinstructions.

Simple Branch example

A simple instruction pointer relative branch that hits the internal cache causes only a one cycle pipeline break for a simple code sequence. The branch then takes an effective 2 clocks. This is the worst case branch time if the instructions are in the instruction cache. This analysis assumes that the instruction sequencer is prevented from performing instruction look ahead on the branch. In general, the execution time of all types of branches is improved by one or two cycles whenever the instruction sequencer can look ahead and do the branch in parallel with previous operations.

Register Bypassing

Register bypassing is also known as result forwarding is described in the above-referenced application Ser. No. 07/488,254. An AND instruction which requires register g4 as an input operand that must be fetched in state 5; however, g4 register contents are updated by the previous instruction (xor) at the very end of state 5. Thus, it is not possible at the highest operating frequency to obtain the updated version of g4 from the register file in time to satisfy the operand fetching requirements of the succeeding and instruction. To alleviate this problem and to insure that RISC-like operations can proceed at the rate of one per cycle, bypass multiplexors are built into the Register File unit. These bypass muxes forward the previous results on the return busses (Load return and REG format instruction return) onto the source busses to the execution hardward so that the bypassed data can be operated on immediately in the next cycle. To accomplish this function, the destination-register address of each returning instruction must be compared against the next instruction's source-register addresses to see if the bypass function needs to be involved, This bypassing is done for all cases of result returns to source reads.

Complex Instructions

Finally, any complex instructions that require a microcode sequence to be executed to complete the function are also detected early and their control-flow (microcode) initation's latency is overlapped with the execution of previous instructions. Due to the RISC-like, fixed instruction length, and orthogonal attributes of the instruction-set encodings, the system can incorporate the instruction-look ahead functions quite cheaply. The micro coded instructions include CALL, RETURN, and some of the complex addressing modes. The optimized look ahead for these complex micro coded instructions saves many cycles.

Figure 2:
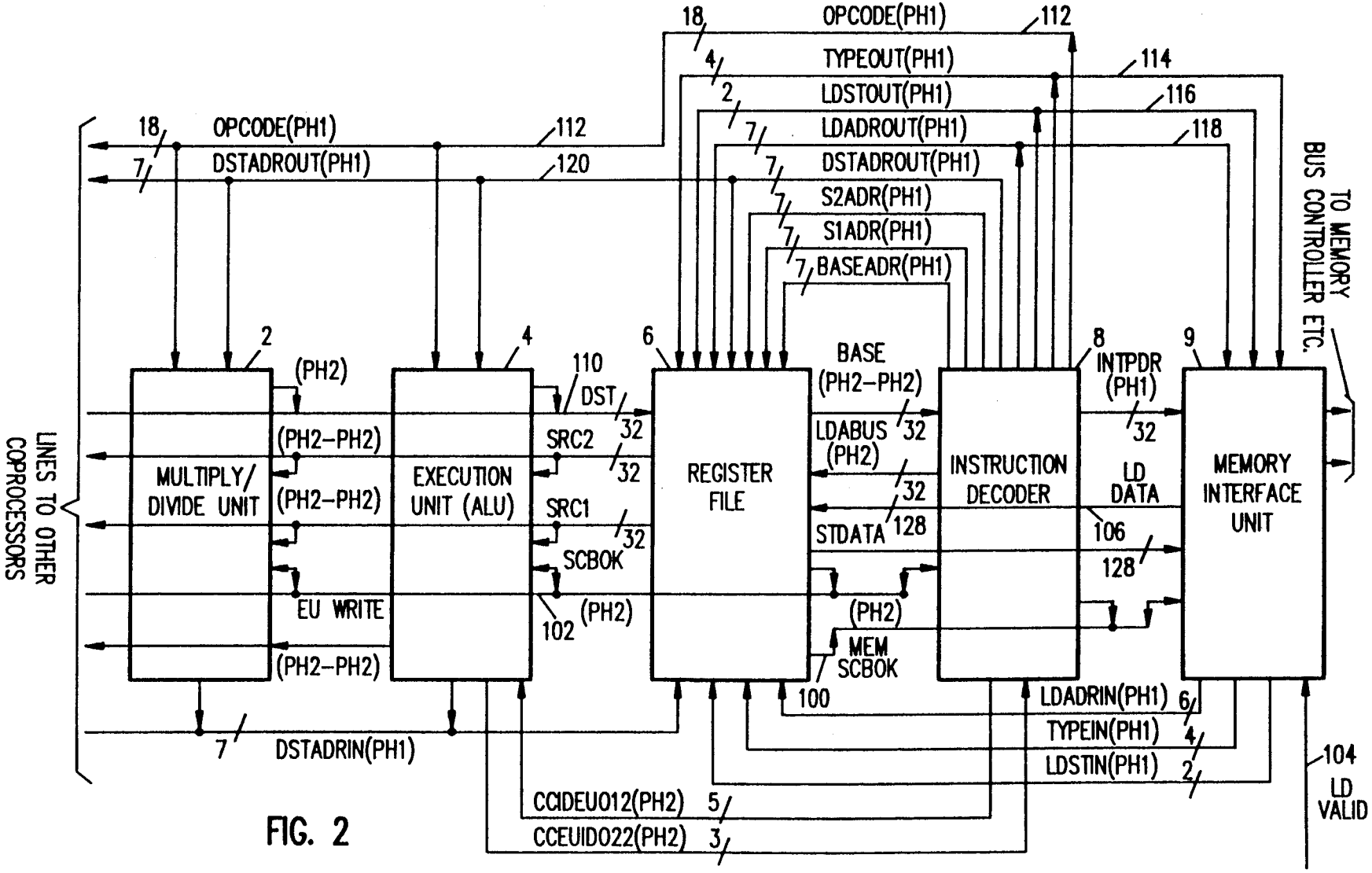
FIG. 2 is a more detailed block diagram of the interconnections between the register file (6) of FIG. 1 and the coprocessors on the machine bus.

FIG. 2 is a diagram showing all the interconnections from the execution unit (EU) to the rest of the system. Below is a general description of all signals connecting the EU with the rest of the system.

Data Buses

There are 3 data buses on the coprocessor side of the microprocessor— the source1 bus (SRc1H/Srcl—64 bis), the source 2 bus (Src2H/Src2—64bits), and the destination bus (Dsthi/Dstlo—64 bits). All coprocessors receive operands from the Register File (RF) or SFR's only and return results to the RF or SFR's only. Source1/Source2 are the input buses which drive data from the RF to all the coprocessors.

Destination (DST) is the precharged bus used by the coprocessors to return results to the RF. All coprocessors hook to these buses; however, the EU in most cases only uses the lower 32 bits of these three buses. Only in the "movl1" instruction does the EU use as input the high 32 bits of Source1. Only in the "movl1" and "mov-add-64" instructions does it drive the high 32 bits of the Destination bus.

Address Buses

All coprocessors hook to two address buses - Dstadrout (7 bits) and Dstardrin (7 bits). The instruction sequencer (IS) broadcasts both the opcode and the destination operand address to all coprocessors simultaneously. The destination operand address is broadcast on the Dstadrout bus. The coprocessor latches this address, executes the instruction, and before returning the result on the destination bus drives the Dstadrin bus with this same address. The Dstadrin bus is a precharge bus which the RF latches and decodes for the destination operand's address.

Along with the Dstadrin bus there is a single line. Wr64bit. This signal is driven by coprocessors to the RF when returning a 64 bit value (instead of a 32 bit value). The EU drives this line only when executing either a "mov1" or "mov-add-64" instruction. This signal is also precharged signal.

The Wr64bit is not broadcast with the Dstadrout. It is determined solely from the opcode. Thus, it follows that the register file must also be able to detect all instructions which return 64 bit values so that appropriate scoreboard bits may be set.

Opcode (and OpcodeL)

The opcodes for instructions can be up to 12 bits long. Of those, 8 bits represent opcodes in one of the four instruction formats. REG, MEM, CPBR, CTRL. The coprocessors only execute the REG format instructions which represent$\theta$ of the opcode space. Thus, of these 8 bits the instruction sequencer only broadcasts 6 bits to the coprocessors on the "opcode" bus; the REG format instruction type on this bus is implied. Four other bits further decode instructions within the REG format space. They are broadcast on the "opcodel" lines. Both "opcode" bus and the "opcodel" bus are precharged buses.

Scbok

This signal is both an input and an output signal to the EU.

In pipestage 1, phase 2, Scbok is an input as far as the EU is concerned. If it is pulled low at this time it indicates that either a resource that the EU needs is not free (i.e. a register to be used as destination) or that another single-cycle coprocessor has faulted or needs an assist. In either case the EU does not execute its instruction.

In pipestage 2, phase 2, scbok is an output as far as the EU is concerned. Scbok is pulled low by the EU in case of an EU fault or event but the current operation the EU is performing continues to completion. Pulling Scbok at this stage stops execution of the next instruction in the pipe and allows the instruction sequencer to start execution of the fault or event handler.

Cceuidq12 and Cceuidq22

This ia 3 bit bus on which the IS sends the condition codes (CCC) to the EU during pipe 1, ph2. The EU is the only unit which can modify the CCC. It does so (if necessary) during pipe 2, ph1 and returns the modified CCC to the IS during the following phase 2—pipe 2, ph2. The Ccequidq22 is the 3 bit bus on which the CCC is returned.

While the invention has been particularly shown and described with reference to preferred embodiments thereof, it will be understood by those skilled in the art that the foregoing and other changes in form and detail may be made therein without departing from the scope of the invention.

What is claimed is:

1. A microprocessor comprising:

a REG interface (14),

A MEM interface (16);

a macro bus (11);

an instruction cache (9) connected to this macro bus capable of supplying multiple instructions on said macro bus during a single clock cycle;

an instruction sequencer (7) connected to said macro bus, said REG interface, said MEM interface;

said instruction sequencer including an instruction decoder and a branch logic;

a multiported register file (6) connected to said instruction sequencer (7) capable of reading from multiple sources of instructions during a single clock cycle;

said instruction decoder within said instruction sequencer (7) being capable of decoding multiple instructions and issuing, multiple instructions during a single clock cycle on said REG interface, said MEM interface and said branch logic;

first coprocessors (2,4,12) connected in parallel to said REG interface for receiving first instructions having a first format from said register file and for executing said instructions in parallel during a single clock cycle; and, second coprocessors (3,5,10) connected in parallel to said MEM interface for receiving second instructions having a second format from said register file and for executing said second instructions in parallel during a single clock cycle.

2. The combination in accordance with claim 1 further comprising:

a local register cache (5) connected to said MEM interface for maintaining a stack of multiple-word local register sets, such that on each call the local registers are transferred from said register file (6) to said Local Register Cache (5) to thereby allocate said local registers in the register file for the called procedure and on a return said words are transferred back into the register file to the calling procedure.

3. The combination in accordance with claim 2 wherein said single-cycle coprocessor (4) is an integer execution unit (4);

said execution unit being capable of executing integer arithmetic operations in a single cycle.

4. A microprocessor comprising:

a REG interface (14);

a MEM interface (16);

a memory coprocessor (10) connected to said MEM interface (16);

a register coprocessor (12) connected to said REG interface (14);

an Instruction Sequencer (7);

a Register File (6) having a first independent read port, a second independent read port, a third independent read port, a fourth independent read port, a first independent write port and a second independent write port;

said REG interface (14) connected to said first and second independent read ports and said first independent wire port;

said MEM interface (16) connected to said third and fourth independent read ports and said second independent write port;

said Instruction Sequencer (7) connected to said REG interface and to said MEM interface;

an Instruction Cache (9) connected to said instruction sequencer and to said MEM interface for providing said Instruction Sequencer with instructions every cycle;

said Cache (9) being multiple words wide and capable of supplying at least two words per clock to said Instruction Sequencer (7);

a single-cycle coprocessor (4) connected to said REG interface (14);

a multiple-cycle coprocessor (2) connected to said REG interface (14);

said Multiply-Divide Unit including means for executing multiply and divide, arithmetic operations requiring multiple cycles; and, an Address Generation Unit (3) connected to said MEM interface (16);

said Address Generation Unit including means for executing load-effective-address instructions and address computations for loads and stores to thereby perform effective address calculations in parallel with instruction execution by said integer execution unit;

said Instruction Sequencer (7) including means for decoding said incoming instruction words from said Cache, and issuing up to three instructions each on one of, said REG interface (14), said MEM interface (26), and said branch logic within said Instruction Sequencer, including means for detecting dependencies between the instructions to thereby prevent collisions between instructions.

5. The combination in accordance with claim 4 further comprising:

a local register cache (5) connected to said MEM interface for maintaining a stack of multiple-word local register sets, such that on each call the local registers are transferred from said register file (6) to said Local Register Cache (5) to thereby allocate said local registers in the register file for the called procedure and on a return said words are transferred back into the register file to the calling procedure.

6. The combination in accordance with claim 4 wherein said single-cycle coprocessor (4) is an integer execution unit (4);

said execution unit being capable of executing integer arithmetic operations in a single cycle.

7. The combination in accordance with claim 4 wherein said a multiple-cycle coprocessor is a multiply-divide unit (2);

said Multiply-Divide Unit being capable of executing multiply and divide arithmetic operations requiring multiple cycles.

8. The combination in accordance with claim 4 wherein said a multiple-cycle coprocessor is a multiply-divide unit (2);

said Multiply-Divide Unit being capable of executing multiply and divide arithmetic operations requiring multiple cycles.

9. In a five pipe-stage pipelined microprocessor which includes an instruction cache (9), an Instruction Sequencer (7) including branch logic, instruction pointer (IP), a REG interface (14), a MEM interface (16), register file (6) of registers including destinations registers, the method comprising the steps of:

(A) accessing (104) said instruction cache (9) during the first pipe stage the Instruction Sequencer (7);

(B) transferring (106) from said I-Cache to said Instruction Sequencer (7) three or four instruction words depending on whether said instruction pointer (IP) points to an even or odd word address;

(C) decoding (108) said instructions in said Instruction Sequencer (7) during said second pipe stage;

(D) checking (110), during said second pipe stage, for dependencies between instructions;

(E) issuing (112), during said second pipe stage, up to three instructions on the three execution portions of the machine, said REG interface (14), said MEM interface (16), and said branch logic within said Instruction Sequencer (7), only the instructions that can be executed;

(F) reading (114) into said register file (6), during said second pipe stage, the sources for all the issued operations;

(G) sending (116) out of said register file (6), during said second pipe stage, said sources for all the issued operations to the respective units to use;

(H) calculating (118), during said second pipe stage, the new IP for branch operations;

(I) returning (122) to said register file, during said third pipe stage, the results of doing the EU (4) and/or the AGU (3) ALU/LDA operations; and, (J) writing (124) said results into said destination registers of said register file.

10. The method in accordance with claim 9 comprising the further steps of:

(K) issuing (128), during said third pipe stage, the address on the external address bus for loads and stores that go off-chip; and, (L) placing (130) data on said external data bus during the fourth pipe stage; and, (M) returning (132) from said bus controller (10) returns said data to said register file during the 5the pipe stage.

* * * * *